United States Patent Office 3,108,129
Patented Oct. 22, 1963

3,108,129
PHENOXARSINYL-PHOSPHONATES
Stanley J. Strycker, Midland, Mich., assignor to The Dow Chemical Company, Midland, Mich., a corporation of Delaware
No Drawing. Filed Feb. 5, 1962, Ser. No. 171,254
7 Claims. (Cl. 260—440)

This invention is concerned with novel compounds and is particularly directed to novel (10-phenoxarsinyl) phosphonates and to a method for the preparation thereof.

The novel compounds of the invention are O,O-di-(lower alkyl) (10-phenoxarsinyl) phosphonates and may be represented by the formula

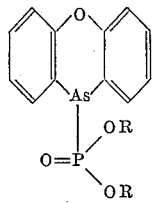

wherein each R is a lower alkyl radical containing from 1 to 6 carbon atoms. These phosphonate compounds are liquids or solids at ordinary temperatures, somewhat soluble in many organic solvents and having only limited solubility in water. The compounds have been found useful as pesticides against a variety of organisms. In particular, the compounds have been found to be active parasiticides, herbicides, molluscacides, insecticides and protozoacides, as well as being active for the control of a variety of bacterial and fungal organisms. Representative species include round worms, aphids, *Aspergillus terreus*, *Staphylococcus aureus* and crab grass.

In accordance with the method of the present invention, it has been found that the compounds of the invention can be prepared in substantially quantitative yields by heating a 10-halophenoxarsine with a tri(lower alkyl) phosphite to a reaction temperature as evidenced by the evolution of gaseous alkyl halide of reaction. In general, the reaction is readily initiated when the reactants are contacted at a temperature of at least about 55° C., preferably at least 75° C., with the evolution of the alkyl halide produced in the reaction. Thus, in a particular reaction system, it is advantageous to maintain the reaction mixture at a temperature above the boiling point of the alkyl halide corresponding to the trialkyl phosphite employed in the reaction to facilitate the removal of the by-product alkyl halide from the reaction zone and to drive the reaction to completion. The exact proportions of reactants are not critical in the reaction; however, substantially quantitative yields are obtained when employing at least 1 mole of trialkyl phosphite per mole of 10-halophenoxarsine in the reaction. The use of excess trialkyl phosphite is not harmful and such phosphite operates as a reaction medium.

In practice, 1 molar proportion of 10-halophenoxarsine such as 10-chlorophenoxarsine or 10-bromophenoxarsine is mixed with at least 1 molar proportion of a trialkyl phosphite in a reaction vessel and the resulting mixture heated gradually with mild agitation to a reaction temperature. Initiation of reaction is evidenced by the evolution of alkyl chloride of reaction. Heating is continued at gradually increasing temperatures until the halophenoxarsine has dissolved completely in the reaction mixture and the evolution of alkyl halide has ceased. On completion of the reaction, the reaction mixture is heated for a period of time under vacuum to remove final traces of alkyl halide of reaction and to recover any unreacted trialkyl phosphite and leave as a residue the desired O,O-dialkyl(10-phenoxarsinyl) phosphonate.

For use as pesticides, the phosphonate compounds of the invention can be formulated with wetting and dispersing agents with or without an inert organic solvent or a finely divided solid carrier to facilitate their distribution for contacting the particular pest to be controlled. Good results have been obtained when employing an aqueous dispersion containing 500 parts by weight of one of the dialkyl(10-phenoxarsinyl) phosphonates per million parts of water as a contact spray for the control of insects such as bean aphid or two-spotted spider mite. In other evaluations, aquatic weeds such as fanwort, moneywort, coontail and Salvinia species are found to be controlled by the dialkyl(10-phenoxarsinyl) phosphonates.

The following examples illustrate the invention but are not to be construed as limiting the same. In the examples, percentages are by weight unless otherwise indicated.

*Example 1*

27.8 grams (0.1 mole) of 10-chlorophenoxarsine and 16.6 grams (0.1 mole) of triethyl phosphite were mixed together and heated slowly with occasional stirring. During the heating period, the chlorophenoxarsine gradually dissolved to form a homogeneous, yellow solution which began to evolve gaseous ethyl chloride when the temperature reached about 75° C. Heating was continued at gradually increasing temperatures up to a temperature of 100°–105° C. and the reaction mixture was maintained at the latter temperature for a period of about 1 hour until gas evolution had substantially ceased. Thereafter, the crude reaction product was heated on the steam bath under vacuum to volatilize residual ethyl chloride and any unreacted triethyl phosphite and to obtain as a residue the O,O-diethyl (10-phenoxarsinyl) phosphonate product as a clear, yellow, mobile liquid having a refractive index of 1.604 at 25° C. This product was found to contain 50.24 percent carbon, 4.77 percent hydrogen and 19.26 percent arsenic by analysis, as compared to corresponding theoretical percentages of 50.54, 4.77 and 19.7, respectively, calculated for O,O-diethyl (phenoxarsinyl) phosphonate.

*Example 2*

27.8 grams of 10-chlorophenoxarsine was slurried in 13.6 grams (0.11 mole) of trimethyl phosphite and the mixture heated slowly to 120° C. At a temperature of about 55° C., evolution of gaseous methyl chloride was observed. During the heating period thereafter, evolution of methyl chloride continued and the chlorophenoxarsine gradually dissolved to produce a clear, homogeneous, liquid reaction mixture. Heating at 120° C. was continued for a period of 30 minutes after the evolution of gaseous methyl chloride had ceased. The reaction mixture was then cooled and reheated on the steam bath under vacuum to complete removal of methyl chloride of reaction and to separate any unreacted trimethyl phosphite. The O,O-dimethyl (10-phenoxarsinyl)

phosphonate product obtained as a residue was a tan, crystalline solid, melting in the range of 83°–90° C. This product was found to contain 47.5 percent carbon, 4.35 percent hydrogen and 21.13 percent arsenic, by analysis, as compared to corresponding percentages of 47.75, 4.01 and 21.27, respectively, calculated for O,O-dimethyl (10-phenoxarsinyl) phosphonate.

*Example 3*

27.8 grams of 10-chlorophenoxarsine and 20.8 grams (0.10 mole) of triisopropyl phosphite were mixed together and heated gradually to a temperature of 125° C. When the mixture reached a temperature in the range of 90°–100° C., vigorous evolution of gaseous isopropyl chloride was observed and the chlorophenoxarsine gradually dissolved. The reaction mixture was maintained at 125° C. for a period of 3 hours to assure completion of the reaction and the clear, yellow reaction mixture then cooled and subsequently reheated under vacuum to separate the last traces of isopropyl chloride and any unreacted triisopropyl phosphite. The desired O,O-diisopropyl (10-phenoxarsinyl) phosphonate was obtained as a residue in the form of a white, waxy solid and was found to contain 52.48 percent carbon, 5.72 percent hydrogen and 19.02 percent arsenic, by analysis, as compared to percentages of 52.95, 5.43 and 18.35, respectively, calculated for O,O-diisopropyl (phenoxarsinyl) phosphonate.

*Example 4*

27.8 grams of 10-chlorophenoxarsine was slurried in 25 grams (0.1 mole) of tri-n-butyl phosphite and the resulting mixture heated gradually to 150° C. Evolution of butyl chloride commenced when the temperature of the mixture reached 90° C. and the chlorophenoxarsine gradually dissolved as heating was continued. The mixture was held at 150° C. until evolution of gas was completed and for 30 minutes thereafter. The resulting clear, homogeneous reaction mixture was cooled and then heated under vacuum for 1 hour to remove traces of butyl chloride and any unreacted tri-n-butyl phosphite. The desired O,O-di-n-butyl (10-phenoxarsinyl) phosphonate product, obtained as a residue, was a clear, yellow liquid having a refractive index of 1.570 at 25° C.

In a similar fashion, triisobutyl phosphite, dimethyl ethyl phosphite, trihexyl phosphite and dimethyl isobutyl phosphite are reacted with 10-chlorophenoxarsine to produce O,O-diisobutyl (10-phenoxarsinyl) phosphonate, O-methyl O-ethyl (10-phenoxarsinyl) phosphonate, O,O-dihexyl (10-phenoxarsinyl) phosphonate, and O-methyl O-isobutyl (10-phenoxarsinyl) phosphonate, respectively.

*Example 5*

In a representative operation, O,O-diethyl (10-phenoxarsinyl) phosphonate was dispersed in water with the aid of a wetting and dispersing agent to prepare an aqueous dispersion containing 500 parts by weight of the phosphonate per million parts of dispersion. Nasturtium plants infested with nymph and adult stages of the bean aphid and cranberry bean plants infested with adult and egg stages of the two-spotted spider mite were dipped into said aqueous dispersion and the treated plants were thereafter maintained in a greenhouse under good growing conditions. Between 72 and 144 hours after the treatment, the treated plants were observed and it was found that 100 percent control of the bean aphid and of the two-spotted spider mite had been obtained.

In a further representative operation, an aqueous dispersion of the O,O-diethyl (10-phenoxarsinyl) phosphonate was added to water in which various submerged and floating aquatic weeds were growing. The amount of the phosphonate added was adjusted to provide a concentration of 10 parts by weight of the active phosphonate compound per million parts of water. The aquatic plants were maintained in the treated water for a period of about 24 hours, after which they were removed, rinsed in fresh water and returned to fresh water in a holding tank in a greenhouse. On observation after a 3-week holding period, it was found that all of the aquatic plants, representing species of Cabomba, Elodea, Lysimastrum and Salvinia, were dead. Untreated plants of the same species maintained in fresh-water holding tanks during the same period were alive and growing.

I claim:

1. A dialkyl (10-phenoxarsinyl) phosphonate having the formula

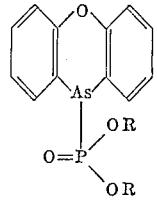

wherein each R represents a lower alkyl radical containing from 1 to 6 carbon atoms.

2. O,O-diethyl (10-phenoxarsinyl) phosphonate.
3. O,O-dimethyl (10-phenoxarsinyl) phosphonate.
4. O,O-diisopropyl (10-phenoxarsinyl) phosphonate.
5. O,O-di-n-butyl (10-phenoxarsinyl) phosphonate.
6. A method for the production of dialkyl (10-phenoxarsinyl) phosphonates which comprises mixing a 10-halophenoxarsine, selected from the group consisting of 10-chlorophenoxarsine and 10-bromophenoxarsine, with a trialkyl phosphite wherein the alkyl radicals contain from 1 to 6 carbon atoms and heating the resulting mixture to a reaction temperature evidenced by the evolution of a gaseous alkyl halide.
7. A method for the preparation of dialkyl(10-phenoxarsinyl) phosphonates which comprises heating a mixture of a 10-halophenoxarsine, selected from the group consisting of 10-chlorophenoxarsine and 10-bromophenoxarsine, with a tri(lower alkyl) phosphite, wherein each lower alkyl radical contains from 1 to 6 carbon atoms, at a temperature in the range of from 55° C. to 150° C. until the evolution of alkyl halide of reaction is completed.

No references cited.